US010614561B2

(12) United States Patent
Li et al.

(10) Patent No.: US 10,614,561 B2
(45) Date of Patent: Apr. 7, 2020

(54) METHOD FOR ENHANCING LOW-ILLUMINATION IMAGE

(71) Applicant: PEKING UNIVERSITY SHENZHEN GRADUATE SCHOOL, Guangdong (CN)

(72) Inventors: Ge Li, Guangdong (CN); Zhenqiang Ying, Guangdong (CN); Yurui Ren, Guangdong (CN)

(73) Assignee: PEKING UNIVERSITY SHENZHEN GRADUATE SCHOOL, Guangdong (CN)

( * ) Notice: Subject to any disclaimer, the term of this patent is extended or adjusted under 35 U.S.C. 154(b) by 0 days.

(21) Appl. No.: 16/478,570

(22) PCT Filed: Aug. 4, 2017

(86) PCT No.: PCT/CN2017/095931
§ 371 (c)(1),
(2) Date: Jul. 17, 2019

(87) PCT Pub. No.: WO2018/133379
PCT Pub. Date: Jul. 26, 2018

(65) Prior Publication Data
US 2019/0333200 A1    Oct. 31, 2019

(30) Foreign Application Priority Data

Jan. 17, 2017    (CN) .......................... 2017 1 0031020

(51) Int. Cl.
*G06T 5/50*    (2006.01)
*H04N 5/235*    (2006.01)
*G06T 7/80*    (2017.01)

(52) U.S. Cl.
CPC ................ *G06T 5/50* (2013.01); *G06T 7/80* (2017.01); *H04N 5/2351* (2013.01);
(Continued)

(58) Field of Classification Search
CPC ... G06T 5/50; G06T 7/80; G06T 2207/20221; G06T 2207/10024; H04N 5/2353; H04N 5/2351
See application file for complete search history.

(56) References Cited

U.S. PATENT DOCUMENTS 7,840,066 B1    11/2010    Chen et al.
2010/0310190 A1*    12/2010    Lin .................... H04N 5/35509
                                                     348/273
(Continued)

FOREIGN PATENT DOCUMENTS

CN    101661620 A    3/2010
CN    101916431 A    12/2010
CN    106875352 A    6/2017

OTHER PUBLICATIONS

International Search Report from PCT/CN2017/095931 dated Oct. 31, 2017, Yu, Lei.
(Continued)

*Primary Examiner* — Gevell V Selby
(74) *Attorney, Agent, or Firm* — BCF LLP

(57) ABSTRACT

The present invention discloses a method for enhancing a low-illumination image based on a camera response characteristic, including: selecting an exposure model and obtaining a camera response equation model corresponding thereto; determining a parameter of the camera response equation model; estimating an exposure ratio of a multi-exposure image sequence to be generated to an original image so as to generate the multi-exposure image sequence; and performing image fusion on multi-exposure images to obtain an enhanced image with a better visual effect and less distortion. The method can solve the problem that existing low-illumination image enhancement algorithms introduce more artificial traces while enhancing images, and can obtain the enhanced image with the better visual effect and
(Continued)

less distortion, thereby obtaining the enhanced image preserving naturalness.

6 Claims, 3 Drawing Sheets

(52) U.S. Cl.
CPC . *H04N 5/2353* (2013.01); *G06T 2207/10024* (2013.01); *G06T 2207/20221* (2013.01)

(56) References Cited

U.S. PATENT DOCUMENTS

| | | | |
|---|---|---|---|
| 2013/0033616 A1* | 2/2013 | Kaizu | H04N 5/35554 348/222.1 |
| 2013/0089270 A1* | 4/2013 | Takayanagi | H04N 5/23245 382/274 |

OTHER PUBLICATIONS

Du, Lin et al.,High Dynamic Range Image Fusion Based on Camera Response Function, Computer Engineering & Science, ISSN: 1007-130X, chapters 1-2.2, vol. 37, No. 7, Jul. 31, 2015, pp. 1331-1337.
English abstract of Du, Lin et al.,High Dynamic Range Image Fusion Based on Camera Response Function, Computer Engineering & Science, ISSN: 1007-130X, chapters 1-2.2, vol. 37, No. 7, Jul. 31, 2015, pp. 1331-1337.
Du, Lin et al., Research Progress of Camera Response Function Calibration, Laser & Infrared, ISSN: 1001-5078, see chapters 1-4, vol. 46, No. 1, Jan. 31, 2016, pp. 17-20.
English Abstract of Du, Lin et al., Research Progress of Camera Response Function Calibration, Laser & Infrared, ISSN: 1001-5078, see chapters 1-4, vol. 46, No. 1, Jan. 31, 2016, pp. 17-20.
Ma, K. et al., Perceptual Quality Assessment for Multi-Exposure Image Fusion, IEEE Transactions on Image Processing, vol. 24 No. 11, Nov. 30, 2015.
Du, Lin et al., Camera Response Function Calibration Algorithm Based on Single Frame Image, Acta Optica Sinica, Acta Opticasinica, vol. 36, No. 7, Jul. 2016, pp. 3345-3356.
English Abstract of Du, Lin et al., Camera Response Function Calibration Algorithm Based on Single Frame Image, Acta Optica Sinica, Acta Optica Sinica, vol. 36, No. 7, Jul. 2016.
English abstract of CN106875352 retrieved from Espacenet on Jun. 26, 2019.
English abstract of CN101661620 retrieved from Espacenet on Jun. 26, 2019.
Shen, Wide Dynamic Range Algorithm Design Based on the Image Signal Processor, Chapter 2, pp. 7-15, Jan. 15, 2013.
English Machine Translation of SHEN, Wide Dynamic Range Algorithm Design Based on the Image Signal Processor, Chapter 2, pp. 7-15, Jan. 15, 2013.
Grossberg et al, Modeling the space of camera response functions, pp. 1272-1282, IEEE transactions on pattern analysis and machine intelligence, Issue 10, vol. 26, Dec. 31, 2004.
Mann, Comparametric Equations with Practical Applications in Quantigraphic Image Processing, IEEE Transactions on Image Processing, Issue 8, vol. 9, Aug. 31, 2000.
English abstract of CN101916431.
First Office Action of Chinese patent application No. 201710031020.9, dated Mar. 22, 2019.
English translation of First Office Action of Chinese patent application No. 201710031020.9, dated Mar. 22, 2019.

\* cited by examiner

METHOD FOR ENHANCING LOW-ILLUMINATION IMAGE

TECHNICAL FIELD

The present invention relates to the technical field of image processing, and particularly relates to a method for enhancing a low-illumination image by using a camera response characteristic.

BACKGROUND ART

A low-illumination image refers to a partially or globally dark image, e.g., an image taken under relatively low illumination. The low-illumination image has poor visibility, which seriously affects observation of people and performances of some computer vision algorithms. The computer vision algorithms usually require that inputted images have relatively high visibility. Most algorithms cannot directly process the low-illumination images. Therefore, some low-illumination images often need to be enhanced before performing corresponding operations. In order to solve this problem, many algorithms for enhancing the low-illumination images have been provided. Low-illumination enhancement algorithms enable the enhanced images to have higher visibility by changing pixel brightness of the inputted images. Existing low-illumination enhancement methods are mainly classified into four types as follows.

I. A method for low-illumination enhancement by mapping with nonlinear equations: some nonlinear monotone equations, such as power functions, logarithmic functions, exponential functions, etc., are used for gray-level mapping.

II. A method for low-illumination enhancement by equalization of histograms: on account of uneven distribution of the histograms of the low-illumination images, this method enhances the low-illumination images by the equalization of the histograms and makes the images have relatively good visibility by changing contrast of the images; however, the method may cause distortion of the enhancement result due to over-enhancement of the contrast of the images.

III. A method for low-illumination enhancement by utilizing a retinal theory: the retinal theory enhances the low-illumination images by dividing the images into two components including irradiance and reflection; and this method can apparently enhance image details, but a halo phenomenon often appears in the enhanced images.

IV. A method for low-illumination enhancement based on a defogging theory: such methods can achieve good subjective results, but can also cause some color distortion due to over-enhancement of the contrast.

In general, the existing methods for enhancing low-illumination images may introduce some artificial traces, such as color distortion, contrast distortion, etc., while enhancing the images, and are hard to obtain the enhanced images preserving naturalness, thereby not only affecting subjective visual perception of people, but also affecting the performance of the computer vision algorithms.

SUMMARY OF THE INVENTION

In order to overcome the above deficiencies of the prior art, the present invention provides a method for enhancing a low-illumination image based on a camera response characteristic, can solve a problem that the existing methods for enhancing low-illumination images introduce more artificial traces while enhancing the images, can obtain the enhanced images with better visual effects and less distortion, and can maintain authenticity of the images to a greater extent, thereby obtaining the enhanced images preserving naturalness.

The present invention adopts a principle that the camera response characteristic can provide a lot of useful information. The camera response characteristic is utilized in the present invention to firstly, select an exposure model capable of accurately describing a relationship between the images with different exposures and obtain a corresponding camera response equation model, then, determine parameters of the model by a camera response curve of cameras corresponding to the low-illumination images or two images with different exposures taken by such cameras, subsequently, estimate an exposure ratio of a multi-exposure image sequence to be generated to an original image and generate a multi-exposure image sequence by utilizing the exposure model, and finally, utilize an image fusion algorithm to fuse the multi-exposure images, thereby obtaining the enhanced image with a better visual effect and less distortion.

The present invention provides a technical solution as follows.

The method for enhancing the low illumination image, based on the camera response characteristic, is adopted for selecting the exposure model and obtaining the camera response equation model corresponding to the exposure model, estimating the exposure ratio of the multi-exposure image sequence to be generated to the original image and generating the multi-exposure image sequence by using the exposure model, performing image fusion on the multi-exposure image sequence, thereby obtaining the enhanced image preserving the naturalness, and includes the following steps:

step 1) inputting a low-illumination image B and calculating a luminance component Y of the image;

step 2) determining the camera response equation model and parameters thereof, including: step 21) selecting the exposure model to further obtain the camera response equation model corresponding to the exposure model; and step 22) determining model parameters of the camera response equation model;

step 3) calculating an exposure ratio set K between the multi-exposure image sequence to be generated and the inputted image B;

step 4) generating the multi-exposure image sequence by using the exposure model according to the exposure ratio set K; and step 5) fusing the obtained multi-exposure image sequence by an image fusion method to obtain and output an enhanced image.

According to the method for enhancing the low-illumination image, the luminance component Y of the image B is further calculated by a formula 6 in the step 1):

$$Y = \sqrt[3]{B_r B_g B_b},\qquad\text{(Formula 6)}$$

in which $B_r$, $B_g$ and $B_b$ represent component values of three channels R, G and B of the image B, respectively.

According to the method for enhancing the low-illumination image, further, the exposure model in the step 21) is formula 1:

$$B_1 \approx (\alpha B_0)^\gamma = \beta B_0^\gamma, \beta = \alpha^\gamma \qquad\text{(Formula 1)},$$

in which $B_0$ and $B_1$ represent two images with different exposures in the same scene; and $\beta$ and $\gamma$ represent two parameters of the exposure model. It can be inferred from the formula 1 that the camera response equation model corresponding to the model is a formula 2:

$$f(E) = \begin{cases} e^{b(1-E^a)}, a = \log_k \gamma, b = \dfrac{\ln\beta}{1-\gamma} & \text{if } \gamma \neq 1 \\ E^c, c = \log_k \beta & \text{if } \gamma = 1 \end{cases} \quad \text{(Formula 2)}$$

in which k represents the exposure ratio of the images $B_1$ and $B_0$; and E represents the irradiance of the scene.

According to the method for enhancing the low-illumination image, the method for determining the camera response parameter of the camera response equation model in the step 22) further includes:

method 1: the camera response curve is fitted by a camera response equation model by using a least square fitting method to obtain response parameters a and b when the camera response curve of the corresponding camera is known; and method 2: the relationship between the images with different exposures in the same scene is mapped by a formula 4 to obtain $\hat{\beta}$ and $\hat{\gamma}$ when the camera response curve camera is unknown:

$$(\hat{\beta}, \hat{\gamma}) = \operatorname{argmin}_{(\beta,\gamma)} \|B_1 - \beta B_0^\gamma\|_2^2 \quad \text{(Formula 4)}.$$

In the formula 4, $B_0$ and $B_1$ represent two images with different exposures in the same scene. The parameters a and b of the response model are obtained according to the camera response equation model of the formula 2 and the exposure ratio k of the images $B_1$ and $B_0$ after obtaining $\hat{\beta}$ and $\hat{\gamma}$.

A method 3: a plurality of real camera response curves are averaged to obtain an average camera response curve to be used as the camera response curve when only one inputted image is provided and information of the camera is unknown; and then the response curve is fitted to obtain the parameters a and b.

According to the method for enhancing the low-illumination image, the step 3) of estimating the exposure ratio set K further includes the following steps:

step 31) defining a weight matrix of the image as a formula 7, for indicating exposure conditions of different pixels in one image:

$$W_k = e^{-\dfrac{(Y_k - 0.5)^2}{2\sigma^2}} ; \quad \text{(Formula 7)}$$

in the formula 7, $Y_k$ represents the luminance component of the image with the exposure ratio k to the inputted image; $W_k$ is the weight matrix corresponding to the image $Y_k$; and the larger the weight value of some point in the matrix is, the closer the point is to the normal exposure;

step 32) defining addition and subtraction of the weight matrix, in which the addition is a formula 8, and the subtraction is a formula 9:

$$W_i \oplus W_j \triangleq \max(W_i, W_j) \quad \text{(Formula 8)};$$

$$W_i \ominus W_j \triangleq \max((W_i - W_j), 0) \quad \text{(Formula 9)};$$

in the formulas 8 and 9, the max operation represents maximization of corresponding elements in the matrix; and step 33) estimating and generating the exposure ratio set K, including:

step 331) presetting a threshold τ of the total exposure weight value, calculating the exposure weight matrix $W_1$ of the inputted image, initializing the exposure weight matrix $W \leftarrow W_1$ of a current exposure sequence, and simultaneously exposing the ratio set $K \leftarrow \{1\}$;

step 332) searching for an exposure ratio $\hat{k}$ which increases a total amount of exposure weights W of the current exposure sequence most;

step 333) recording the obtained exposure ratio $K \leftarrow K \cup \hat{k}$, and simultaneously updating the current exposure sequence weight matrix $W \leftarrow W \oplus W_{\hat{k}}$, and returning to the step 332) to continue to search for the next exposure ratio $\hat{k}$ when an exposure weight increase amount is not less than the threshold τ; and step 334) ending the operation to obtain the exposure ratio set K when the total amount of exposure weights is less than the threshold τ.

According to the method for enhancing the low-illumination image, the threshold τ is equal to 0.01 in embodiments of the present invention.

According to the method for enhancing the low-illumination image, sequentially let $k_*$ be equal to each element in the exposure set K in the step 4). The multi-exposure image sequence is generated by a formula 5:

$$B_* = \beta_* B_0^{\gamma_*} = f(k_*) B_0^{k_* a} = e^{b(1-k_* a)} B_0^{k_* a} \quad \text{(Formula 5)}.$$

In the formula 5, $k_*$ represents an element in the exposure ratio set K; $B_0$ represents the inputted low-illumination image; and $B_*$ represents the generated image having the exposure ratio of $k_*$ to the inputted image $B_0$.

According to the method for enhancing the low-illumination image, the image fusion method in the step 5) may further be any existing multi-exposure image fusion algorithm. An image fusion method recorded in a literature (Ma Kede and Wang Zhou, MULTI-EXPOSURE IMAGE FUSION: A PATCH-WISE APPROACH, IEEE ma2015multi, 2015) is specifically adopted in embodiments of the present invention. The method can fuse the multi-exposure images and obtain a multi-exposure image with good visual effect. Specifically, the fusion method divides the multi-exposure image into different image blocks, then decomposes each image block into three parts: a signal intensity, a signal structure and an average brightness, and finally fuses the image blocks of different exposure images according to an image block intensity and an exposure quantity, thereby obtaining the final fused image.

Compared with the prior art, the present invention has beneficial effects as follows.

The present invention provides an algorithm for enhancing the low-illumination image based on the camera response characteristic, which can preserve image naturalness. The algorithm provided by the present invention firstly selects the exposure model capable of accurately describing the relationship between the images with different exposures and obtains the corresponding camera response equation model, then, determines the parameters of the model by the camera response curve of the cameras corresponding to the low-illumination images or two images with different exposures taken by such cameras, subsequently, estimates the exposure ratio of the multi-exposure image sequence to be generated to the original image and generates the multi-exposure image sequence by utilizing the exposure model, and finally, utilizes the image fusion algorithm to fuse the multi-exposure images to obtain the enhanced image. The present invention can solve the problem that the existing algorithms for enhancing low-illumination images introduce more artificial traces while enhancing the images, can obtain the enhanced images with better visual effects and less distortion, and can maintain authenticity of the images to a greater extent, thereby obtaining the enhanced images preserving naturalness. The method can be applied to various computer vision fields as an image preprocessing method.

DETAILED DESCRIPTION OF THE INVENTION

The present invention is further described through embodiments in combination with the accompanying drawings, but is not limited in any way.

Figure 1:
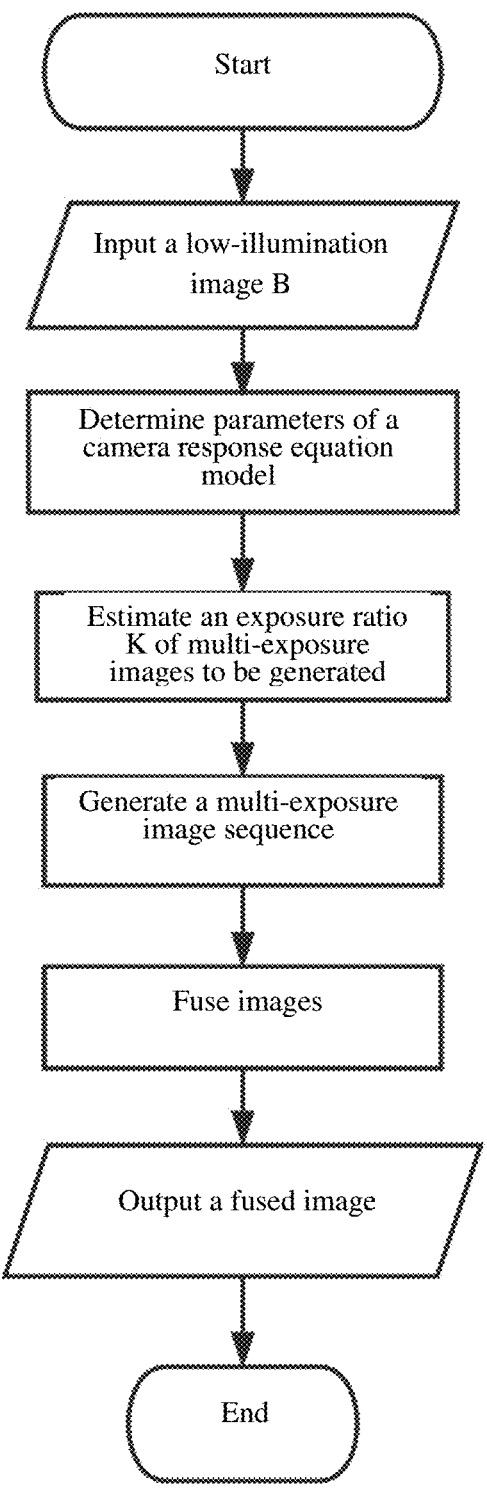
FIG. 1 is a block diagram illustrating a flow of a method for enhancing a low-illumination image provided by the present invention.

The present invention provides an algorithm for enhancing a low-illumination image based on a camera response characteristic, which can preserve image naturalness. The algorithm provided by the present invention firstly selects an exposure model capable of accurately describing a relationship between images with different exposures and obtains a corresponding camera response equation model, then, determines parameters of the model by a camera response curve of cameras corresponding to low-illumination images or two images with different exposures taken by such cameras, subsequently, estimates an exposure ratio of a multi-exposure image sequence to be generated to an original image and generates the multi-exposure image sequence by utilizing the exposure model, and finally, utilizes an image fusion algorithm to fuse the multi-exposure images to obtain an enhanced image. FIG. 1 is a block diagram illustrating a flow of a method for enhancing the low-illumination image provided by the present invention. The method includes the following steps:

Step 1, selection of the exposure model: the exposure model capable of accurately describing the relationship between the images with different exposures is selected. An expression for the exposure model is:

$$B_1 \approx (\alpha B_0)^\gamma = \beta B_0^\gamma, \beta = \alpha^\gamma \quad \text{(Formula 1)},$$

in which $B_0$ and $B_1$ represent two images with different exposures in the same scene; and $\beta$ and $\gamma$ represent two parameters of the exposure model. In an experiment, it can be observed that values of the parameters $\beta$ and $\gamma$ of three channels R, G and B have little difference for a color image. Thus, it is assumed that the three channels share a set of parameters.

It can be obtained that an expression for the camera response equation model corresponding to the exposure model is a formula 2:

$$f(E) = \begin{cases} e^{b(1-E^a)}, a = \log_k \gamma, b = \frac{\ln \beta}{1-\gamma} & \text{if } \gamma \neq 1 \\ E^c, c = \log_k \beta & \text{if } \gamma = 1 \end{cases} \quad \text{(Formula 2)}$$

in which k represents the exposure ratio of the images $B_1$ and $B_0$; E represents an irradiance of the scene; and a, b and c are the parameters of the camera response equation model, and have relationships with the parameters $\beta$ and $\gamma$ of the exposure model listed in the formula 2.

Step 2, determination of the parameters a and b of the camera response equation model: for a specific camera, its model parameters need to be determined. The camera response curve can be fitted by the camera response equation model by using a least square fitting method to obtain response parameters a and b if the camera response curve of the corresponding camera is known.

$$(\hat{a},\hat{b})=\text{argmin}_{(a,b)}\Sigma_{i=1}^n(y_i-f(E_i))^2 \quad \text{(Formula 3)}.$$

In the formula 3, n represents the number of sample points extracted from the curve; $E_i$ represents an irradiance corresponding to an ith sample point; $y_i$ represents a luminance value of the image when the irradiance is $E_i$; and f represents a camera response formula in the formula 2. The relationship between the two images with different exposures in the same scene is mapped by a formula 4 to obtain $\hat{\beta}$ and $\hat{\gamma}$ if the camera response curve is unknown:

$$(\hat{\beta},\hat{\gamma})=\text{argmin}_{(\beta,\gamma)}\|B_1-\beta B_0^\gamma\|_2^2 \quad \text{(Formula 4)}.$$

In the formula 4, $B_0$ and $B_1$ represent the two images with different exposures in the same scene.

The parameters a and b of the response model are obtained according to the formula 2 and the exposure ratio k of $B_1$ and $B_0$ after obtaining $\hat{\beta}$ and $\hat{\gamma}$.

A plurality of real camera response curves can be averaged to obtain an average camera response curve for approximately expressing the camera response curve when only one inputted image is inputted and information of the specific camera is unknown; and then the response curve is fitted to obtain the parameters a and b.

Step 3, inputting of the low-illumination image: one low-illumination image B is inputted, a luminance component Y of the image is calculated, and the luminance component is calculated by a formula 6:

$$Y = \sqrt[3]{B_r B_g B_b}, \quad \text{(Formula 6)}$$

in which $B_r$, $B_g$ and $B_b$ represent component values of the three channels R, G and B, respectively.

Figure 2:
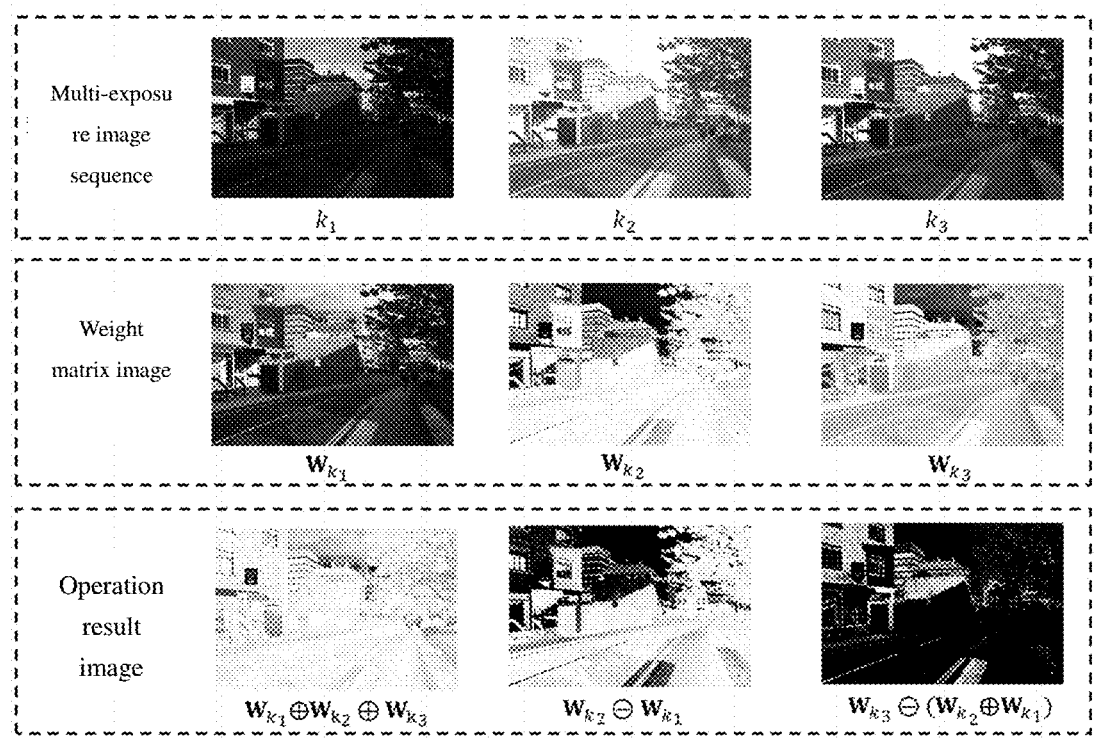
FIG. 2 is a schematic diagram illustrating a multi-exposure image sequence, a weight matrix thereof and a weight matrix operation result in embodiments,
in which a first line shows the multi-exposure image sequence of a scene, a second line shows a weight matrix diagram of the multi-exposure image sequence, and a third line shows an image of the weight matrix operation result.

Step 4, estimation of the exposure ratio K: different multi-exposure image sequences will have a great impact on performance of the image fusion algorithm. Therefore, in order to obtain a better image fusion result and realize a highest image fusion program operation efficiency, an exposure ratio set K between each image and the inputted image in the multi-exposure image sequence needs to be reasonably selected. An ideal exposure ratio set K should reflect as much scene information as possible with as few images as possible. In general, for the image fusion algorithm, a reasonable exposure region will carry more scene information than an unreasonable exposure region. Therefore, the multi-exposure sequence images should reasonably expose as many points as possible in the scene. The first line of a FIG. 2 shows the multi-exposure image sequence of a scene. It can be seen that the three images reasonably expose the blue sky, roads and buildings, respectively.

To evaluate exposure conditions of different pixels in one image, a weight matrix of the image is defined as a formula 7:

$$W_k = e^{\frac{(Y_k - 0.5)^2}{2\sigma^2}}. \quad \text{(Formula 7)}$$

In the formula, $Y_k$ represents the luminance component of the image with the exposure ratio k to the inputted image; and $W_k$ is the weight matrix corresponding to the image $Y_k$. The larger the value of some point in the matrix is, the closer the point is to the normal exposure, the more the scene information is provided. The second line of the FIG. 2 shows a diagram illustrating the weight matrix of the multi-exposure image sequence. The brighter the point is, the closer it is to reasonable exposure in the diagram.

As mentioned before, reasonable exposure regions in the images with different exposure values are also not identical. When the multi-exposure image sequence of some scene is known, the addition of the weight matrix is defined as a formula 8 to evaluate the exposure conditions of different pixels in the scene:

$$W_i \oplus W_j \triangleq \max(W_i, W_j) \quad \text{(Formula 8)}$$

In the formula, the max operation represents maximization of corresponding elements in the matrixes $W_i$ and $W_j$. Meanwhile, the subtraction of the weight matrix is defined as a formula 9:

$$W_i \ominus W_j \triangleq \max((W_i, W_j), 0) \quad \text{(Formula 9)}.$$

The formula 9 represents which pixels in the scene may tend to reasonable exposure by increasing the image $B_i$ with the exposure ratio i when the image $B_j$ with the exposure ratio j is known.

The third line of the FIG. 2 shows an image of a weight matrix operation result.

According to the above definitions, a generation algorithm of K can be written as shown in an algorithm 1 (exposure ratio generator):

---
Algorithm 1: exposure ratio generator
---
Input: a brightness image Y of a low-illumination image Y
Output: an exposure ratio K of the multi-exposure image
The number of pixels in N ← Y;
K ← {1};
W ← $W_1$;
While true do
  $\hat{k}$ ← $\text{argmax}_k \|W_k \ominus W\|_1$;
  if $\frac{\|W_{\hat{k}} \ominus W\|_1}{N} < \tau$
  break;
  else
  W W ⊕ $W_{\hat{k}}$;
  K ← K ∪ {$\hat{k}$}
    End
  End
---

The exposure ratio is obtained by a generator algorithm, including: firstly, an exposure weight matrix of the inputted image is calculated, the weight matrix W and the exposure ratio rate K of a current exposure sequence are initialized simultaneously; then, an exposure ratio $\hat{k}$ which maximizes increase of the total amount of weight of the exposure weight W of the current exposure sequence is searched and obtained; whether the total amount of the increased exposure weight is smaller than a preset threshold τ is judged; if the total amount is smaller than the threshold, which proves that the amount of increased weight is already small, the program is terminated by jumping out of the loop and K is outputted; otherwise, the obtained exposure ratio $\hat{k}$ is recorded; meanwhile, a current exposure sequence weight matrix W is updated; and the next exposure ratio $\hat{k}$ is continuously searched until the algorithm is terminated, and K is outputted. Step 5, generation of the multi-exposure image sequence: sequentially let $k_*$ be equal to each element in the exposure set K by utilizing the parameters a and b obtained in the step 2) and the exposure ratio set K obtained in the step 4). The multi-exposure image sequence is generated by a formula 5:

$$B_* = \beta_* B_0^{\gamma_*} = f(k_*) B_0^{k_* a} = e^{b(1-k_* a)} B_0^{k_* a} \quad \text{(Formula 5)}.$$

In the formula 5, $k_*$ represents an element in the exposure ratio set K; $B_0$ represents the inputted low-illumination image; and $B_*$ represents the generated image having the exposure ratio of $k_*$ to the inputted image $B_0$.

Step 6, image fusion: the images obtained in the step 5) are fused by utilizing image fusion to obtain and output an enhanced image.

The method for enhancing the low-illumination image according to the present invention is utilized to perform image enhancement on the low-illumination image B shown in a FIG. 3 in the following embodiment, and includes the following steps:

Step 1, determination of the parameters a and b of the camera response equation model: it is assumed that the information of the specific camera is unknown, all response curves in the real camera response curve DoRF data set proposed in a literature (Grossberg, Michael D and Nayar, Shree K, What is the Space of Camera Response Functions?, IEEE grossberg2003space, 2003) are averaged to obtain the average camera response curve. The parameters a and b of the camera response equation model are determined by a formula (formula 3):

$$(\hat{a}, \hat{b}) = \text{argmin}_{(a,b)} \Sigma_{i=1}^n (y_i - f(E_i))^2 \quad \text{(Formula 3)}.$$

Let n=256, $E_i$ is uniformly distributed over [0, 1]; and the curve is fitted to obtain the parameters a=−0.3293 and b=1.1258.

Figure 3:
FIG. 3 is a low-illumination input image adopted in embodiments of the present invention.

Step 2, inputting of the low-illumination image: one low-illumination image B is inputted, as shown in the FIG. 3; and the luminance component Y of the image is calculated by a formula (formula 6):

$$Y = \sqrt[3]{B_r B_g B_b}. \quad \text{(Formula 6)}$$

Step 3, estimation of the exposure ratio K: let k=1 and σ=0.5, and a weight matrix $W_1$ of the inputted image is calculated according to the algorithm 1 (exposure ratio generator) and a formula (formula 7) at the first:

$$W_k = e^{\frac{(Y_k - 0.5)^2}{2\sigma^2}}. \quad \text{(Formula 7)}$$

Let W←$W_1$, the corresponding k is calculated according to a formula (formula 11):

$$\hat{k} \leftarrow \text{argmax}_k \|W_k \ominus W\|_1 \quad \text{(Formula 11)}.$$

Then, whether a formula 12 is true is judged:

$$\frac{\|W_{\hat{k}} \ominus W\|}{N} < \tau. \quad \text{(Formula 12)}$$

In the formula 12, let the threshold $\tau=0.01$. If it is true, the program is terminated by jumping out of the loop, and a set K is outputted. Otherwise, the obtained exposure ratio $\hat{k}$ is recorded. Meanwhile, the current exposure sequence image weight matrix W is updated by a formula 13:

$$W=W\oplus W_{\hat{k}} \quad \text{(Formula 13)}.$$

The next exposure ratio $\hat{k}$ is continuously searched until the algorithm is terminated; and the set K is outputted.

Step 4, generation of the multi-exposure image sequence: sequentially let $k_*$ be equal to each element in the set K, and the multi-exposure image sequence is generated by a formula (formula 5):

$$B_*=\beta_* B_0^{\gamma*}=f(k_*)B_0^{k*a}=e^{b(1-k*a)}B_0^{k*a} \quad \text{(Formula 5)}.$$

Figure 4:
FIG. 4 is an enhanced image obtained in embodiments of the present invention.

Step 5, image fusion: the generated image sequence can be fused by any multi-exposure image fusion algorithm to obtain the enhanced image in this step. The image fusion method recorded in the literature (Ma Kede and Wang Zhou, MULTI-EXPOSURE IMAGE FUSION: A PATCH-WISE APPROACH, IEEE ma2015multi, 2015) is selected in the present embodiment. The method can fuse the multi-exposure images and obtain a multi-exposure image with good visual effect. Specifically, the fusion method divides the multi-exposure image into different image blocks, then decomposes each image block into three parts: a signal intensity, a signal structure and an average brightness, and finally fuses the image blocks of different exposure images according to an image block intensity and an exposure quantity, thereby obtaining the final fused image. The enhanced image obtained by image enhancement is as shown in a FIG. 4.

It should be noted that embodiments are disclosed to help further understanding of the present invention, but those skilled in the art can understand that various replacements and modifications are possible without departing from the spirit and scope of the present invention and the appended claims. Therefore, the present invention shall not be limited to what is disclosed in the embodiments. The protection scope claimed by the present invention shall be subject to a scope defined by the claims.

The invention claimed is:

1. A method for enhancing a low illumination image, comprising: based on a camera response characteristic, selecting an exposure model and obtaining a camera response equation model corresponding to the exposure model; estimating an exposure ratio of a multi-exposure image sequence to be generated to an original image, and generating the multi-exposure image sequence by using the exposure model and the estimated exposure ratio; and performing image fusion on the multi-exposure image sequence, thereby obtaining the enhanced image preserving naturalness; specifically comprising the following steps:

step 1) inputting a low-illumination image and calculating a luminance component of the image;

step 2) determining the camera response equation model and parameters thereof, comprising:

step 21) selecting the exposure model to obtain the camera response equation model corresponding to the exposure model; and step 22) determining model parameters of the camera response equation model;

step 3) calculating an exposure ratio set between the multi-exposure image sequence to be generated and the inputted low-illumination image;

step 4) generating the multi-exposure image sequence by using the exposure model according to the exposure ratio set; and step 5) fusing the obtained multi-exposure image sequence by an image fusion method to obtain and output an enhanced image;

wherein that the step 3) of estimating the exposure ratio set comprises the following steps:

step 31) defining a weight matrix of the image as a formula 7, for indicating exposure conditions of different pixels in one image:

$$W_k = e^{\frac{(Y_k - 0.5)^2}{2\sigma^2}} \quad \text{(Formula 7)};$$

in the formula 7, $Y_k$ represents the luminance component of the image with the exposure ratio k to the inputted image; $W_k$ is the weight matrix corresponding to the image $Y_k$;

and the larger the weight value of some point in the matrix is, the closer the point is to the normal exposure;

step 32) defining addition and subtraction of the weight matrix, in which the addition is a formula 8, and the subtraction is a formula 9:

$$W_i \oplus W_j \triangleq \max(W_i, W_j) \quad \text{(Formula 8)};$$

$$W_i \ominus W_j \triangleq \max((W_i - W_j), 0) \quad \text{(Formula 9)};$$

in the formulas 8 and 9, the max operation represents maximization of corresponding elements in the matrixes $W_i$ and $W_j$; and step 33) estimating and generating the exposure ratio set K, comprising;

step 331) putting the inputted image into a multi-exposure sequence, and presetting a threshold $\tau$ of the total exposure weight value;

step 332) searching for an exposure ratio $\hat{k}$ which increases a total amount of exposure weights of the inputted image most;

step 333) recording the obtained exposure ratio $\hat{k}$ when the total amount of exposure weights is not less than the threshold; simultaneously updating the current exposure sequence weight matrix W; and returning to the step 332) to continue to search for the next exposure ratio $\hat{k}$; and step 334) ending the operation to obtain the exposure ratio set K when the total amount of exposure weights is less than the threshold.

2. The method for enhancing the low-illumination image according to claim 1, wherein the exposure model in the step 21) is formula 1:

$$B_1 \approx (\alpha B_0)^\gamma = \beta B_0^\gamma, \beta = \alpha^\gamma \quad \text{(Formula 1)},$$

in which $B_0$ and $B_1$ are two matrixes that represent two images with different exposure values in the same scene; and $\beta$ and $\gamma$ represent two parameters of the exposure model;

for a color image, it is assumed that three channels R, G and B share parameters $\beta$ and $\gamma$ to obtain the camera response equation model corresponding to the model of the formula 1 as a formula 2:

$$f(E) = \begin{cases} e^{b(1-E^a)}, a = \log_k \gamma, b = \frac{\ln \beta}{1-\gamma} & \text{if } \gamma \neq 1 \\ E^c, c = \log_k \beta & \text{if } \gamma = 1 \end{cases} \quad \text{(Formula 2)},$$

in which k represents the exposure ratio of the images $B_1$ and $B_0$; E represents the irradiance of the scene; and a, b and c are the parameters of the camera response equation model.

3. The method for enhancing the low-illumination image according to claim 1, wherein the method for determining the camera response parameter a and b of the camera response equation model in the step 22) is selected from one of the following methods:

method 1: a camera response curve is fitted by a camera response equation model by using a least square fitting method to obtain response parameters a and b when the camera response curve of the corresponding camera is known;

method 2: the relationship between two images with different exposures in the same scene is mapped by a formula 4 to obtain $\hat{\beta}$ and $\hat{\gamma}$ when the camera response curve camera is unknown:

$$(\hat{\beta},\hat{\gamma})=\mathrm{argmin}_{(\beta,\gamma)}\|B_1-\beta B_0^\gamma\|_2^2 \qquad \text{(Formula 4)};$$

in the formula 4, $B_0$ and $B_1$ are two matrixes that represent two images with different exposures in the same scene;

the parameters a and b of the response model are obtained according to the camera response equation model and the exposure ratio k of $B_1$ and $B_0$ after obtaining $\hat{\beta}$ and $\hat{\gamma}$; and method 3: a plurality of real camera response curves are averaged to obtain an average camera response curve to be used as the camera response curve when only one low-illumination image is provided and information of the camera is unknown; and then the response curve is fitted to obtain the parameters a and b.

4. The method for enhancing the low-illumination image according to claim 1, wherein in the step 4), the multi-exposure image sequence with any exposure is generated by a formula 5:

$$B_*=\beta_* B_0^{\gamma_*}=f(k_*)B_0^{k_* a}=e^{b(1-k_* a)}B_0^{k_* a} \qquad \text{(Formula 5)};$$

in the formula 5, $k_*$ represents an exposure ratio between the generated image $B_*$ and the original image $B_0$.

5. The method for enhancing the low-illumination image according to claim 1, wherein the luminance component of the low-illumination image is calculated by a formula 6 in the step 1):

$$Y = \sqrt[3]{B_r B_g B_b}, \qquad \text{(Formula 6)}$$

in which Y represents the luminance component of the image; and $B_r$, $B_g$ and $B_b$ represent component values of three channels R, G and B of the image respectively.

6. The method for enhancing the low-illumination image according to claim 1, wherein that the threshold $\tau$ is equal to 0.01.

\* \* \* \* \*